United States Patent [19]

Inoue et al.

[11] 4,432,205
[45] Feb. 21, 1984

[54] SUPERCHARGER APPARATUS FOR INTERNAL COMBUSTION ENGINE

[75] Inventors: Kazuo Inoue, Tokyo; Minoru Matsuda, Chofu; Kentaro Kato, Niiza, all of Japan

[73] Assignee: Honda Giken Kogyo Kabushiki Kaisha, Tokyo, Japan

[21] Appl. No.: 255,856

[22] Filed: Apr. 20, 1981

[30] Foreign Application Priority Data

Apr. 25, 1980 [JP] Japan .................................. 55/54351
Apr. 25, 1980 [JP] Japan ........................... 55/55987[U]

[51] Int. Cl.³ ........................ F02B 37/00; F02B 61/02
[52] U.S. Cl. ...................................... 60/605; 180/219
[58] Field of Search ............ 60/605, 624; 123/196 R; 180/219

[56] References Cited

U.S. PATENT DOCUMENTS

| | | | |
|---|---|---|---|
| 1,006,907 | 10/1911 | Buchi | 60/605 |
| 3,014,554 | 12/1961 | Etchells | 123/196 R |
| 3,200,580 | 8/1965 | Millar | 123/196 R |
| 3,242,665 | 3/1966 | Flater | 60/624 |
| 3,673,798 | 7/1972 | Kuehl | 60/605 |
| 3,807,168 | 4/1974 | Bachmann | 60/624 |
| 4,019,324 | 4/1977 | Coxon | 60/624 |
| 4,121,558 | 10/1978 | Sakakibara | 123/196 R |

FOREIGN PATENT DOCUMENTS

| | | | |
|---|---|---|---|
| 407141 | 12/1924 | Fed. Rep. of Germany . | |
| 975375 | 11/1961 | Fed. Rep. of Germany . | |
| 1180677 | 1/1959 | France . | |
| 54-118907 | 9/1979 | Japan | 180/219 |
| 27511 | of 1910 | United Kingdom | 60/624 |
| 369033 | 3/1932 | United Kingdom . | |
| 442154 | 2/1936 | United Kingdom | 60/605 |

*Primary Examiner*—Douglas Hart
*Attorney, Agent, or Firm*—Armstrong, Nikaido, Marmelstein & Kubovcik

[57] ABSTRACT

A supercharger apparatus is provided which comprises a reciprocating type internal combustion engine having a block, an exhaust passage and an intake passage, and also having an exhaust turbine which is provided in said exhaust passage. A compressor is provided in said intake passage, along with a shaft for interconnecting said turbine and said compressor, the shaft being supported in a bearing hole which is formed in the engine block. A lubrication oil passage, which is in communication with the bearing hole, is formed in the engine block.

4 Claims, 6 Drawing Figures

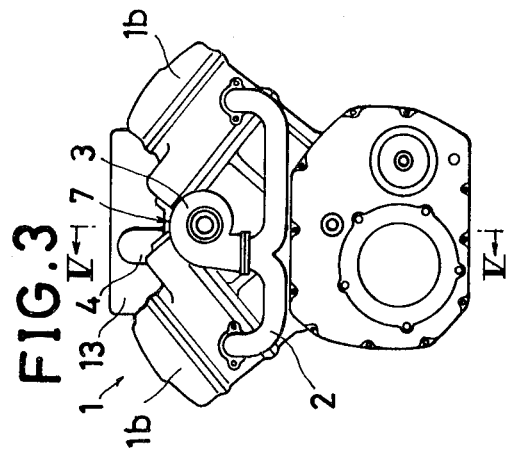
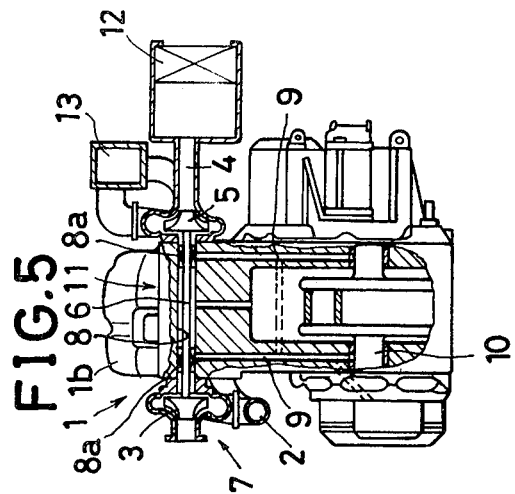
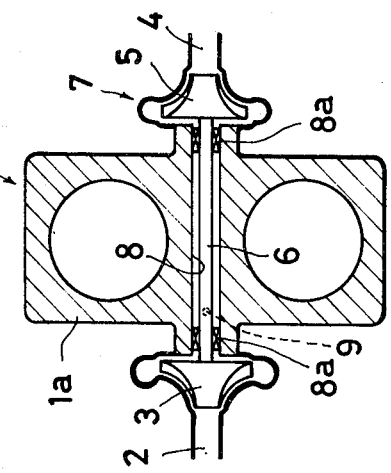
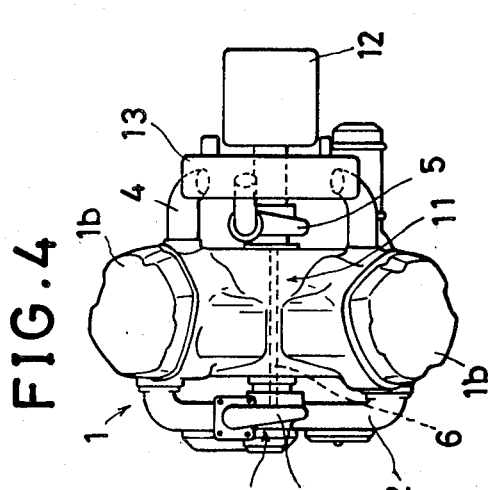
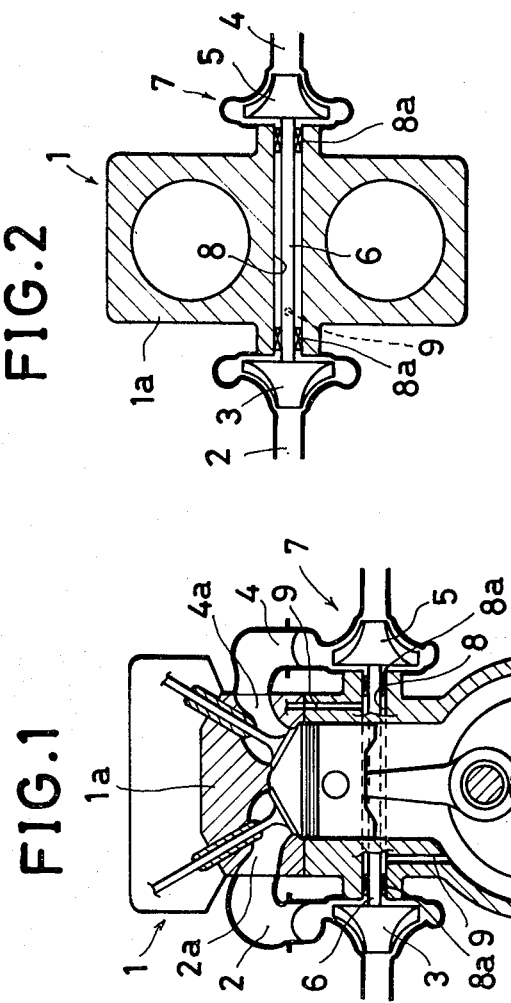

SUPERCHARGER APPARATUS FOR INTERNAL COMBUSTION ENGINE

BACKGROUND OF THE INVENTION

1. Field of the Invention

This invention relates to a supercharger in a reciprocating type internal combustion engine and, more particularly, to a supercharger in which the compressor and exhaust turbine thereof are coupled to one another by a shaft passing through a hole through the shaft and the bearings supporting the engine are lubricated by the engine lubrication.

2. Description of the Prior Art

There has been hitherto known a reciprocating type internal combustion engine with a supercharger comprising an exhaust turbine provided in an exhaust passage of the engine, a compressor provided in an intake passage of the engine and a shaft for interconnecting between the turbine and the compressor.

SUMMARY OF THE INVENTION

It is the primary object of the present invention to provide a supercharger for an engine wherein the compressor and exhaust turbine of the supercharger are coupled together by a shaft which passes through a hole formed in the engine block of the engine.

It is another object of the present invention to provide bearings for the shaft in the hole and to lubricate the bearings.

It is still a further object of the present invention to provide an oil passage for carrying lubricant from the engine lubrication supply to the bearings for lubricating the bearings.

The present invention is directed to a reciprocating type internal combustion engine having a supercharger. The supercharger comprises an exhaust turbine provided in an exhaust passage of the engine, a compressor provided in an intake passage of the engine and a shaft for interconnecting the turbine and the compressor. The shaft is supported in a bearing hole made through the engine block, and a lubrication oil passage which is in communication with the bearing hole is provided in the engine block to carry engine lubrication oil to the bearings.

BRIEF DESCRIPTION OF THE DRAWINGS

FIG. 1 is a sectional side view of one embodiment of the present invention;

FIG. 2 is a sectional plan view thereof;

FIG. 3 is a top plan view of another embodiment of the present invention;

FIG. 4 is a front view thereof;

FIG. 5 is a sectional side view taken along line V—V in FIG. 3; and

DETAILED DESCRIPTION OF THE PREFERRED EMBODIMENTS

Figure 6:
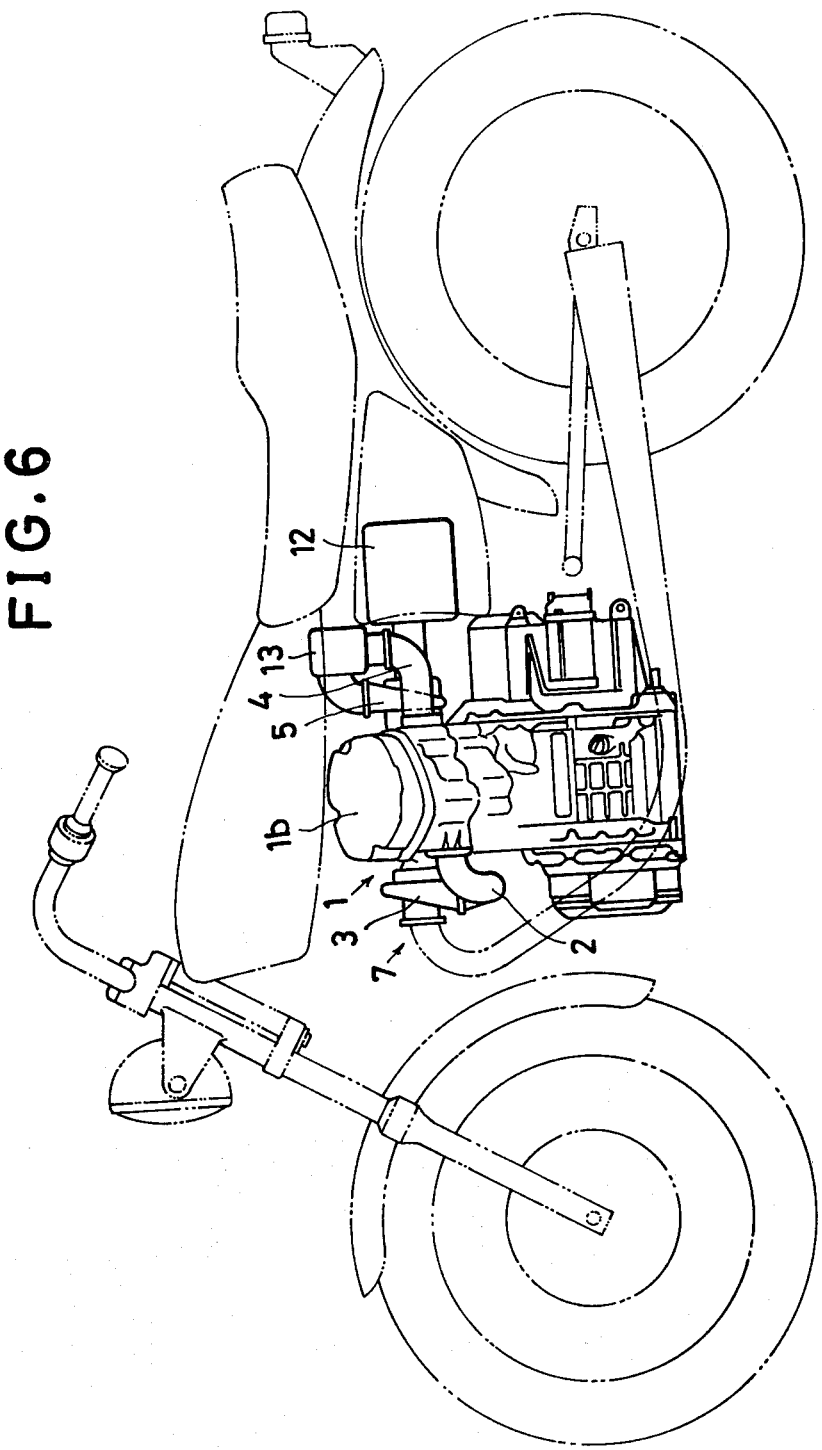
FIG. 6 is a side view of the present invention mounted on a vehicle.

Referring to FIGS. 1 and 2 showing one embodiment of the present invention, a reciprocating type internal combustion engine 1 has an exhaust passage 2 and an exhaust turbine 3 is provided in the exhaust passage 2. The turbine 3 is connected through a shaft 6 to a compressor 5 provided in an intake passage 4 of the engine 1. A supercharger 7 includes the turbine 3, compressor 5 and shaft 6. The shaft 6 is inserted through and supported by bearings in a bearing hole 8 made through the block of the engine 1. A lubrication oil passage 9, which is in communication with the bearing hole 8, is provided in the block of the engine 1 so that the lubrication oil for the engine 1 may be supplied to the bearing hole 8 in the interior of the engine 1 without providing any external piping.

An oil seal member 8a is provided near each end of the bearing hole 8.

In the illustrated embodiment, the exhaust turbine 3 and the compressor 5 are disposed on opposite sides of the engine 1 so as to be separated from one another. An exhaust port 2a is connected to the exhaust passage 2 and an intake port 4a is connected to the intake passage 4 and disposed on opposite sides of the engine 1, so as to create a cross-flow. Consequently, piping for the exhaust turbine 3 on the one side of the engine 1 and for the compressor 5 on the other side of the same may be facilitated. Consequently, both the exhaust passage 2 and the exhaust turbine 3, which become comparatively high in temperature, may be separated from the intake passage 4, which prevents the temperature from rising.

In the foregoing embodiment, engine 1 is constructed to be a straight type two-cylinder engine is shown in FIG. 2. Two cylinders 1a,1a are so disposed in-line between the one side and the other side of the body of the engine so as to be at right angles thereto, and the bearing hole 8 extends between the one side and the other side so as to extend at right angles to a crankshaft 10 through an intermediate portion of the engine block between the two cylinders 1a,1a. This invention, however, is not limited to this embodiment and may be so modified to wherein the engine 1 is a V-type, two-cylinder engine that, as shown in FIGS. 3 to 5, has two cylinders 1a,1a which are disposed to be in a V form. The bearing hole 8 extends between said one side and said other side through a bottom portion 11 of a V bank formed between the two cylinders 1a,1a.

Referring to the drawings, an air cleaner 12 is provided on an upstream end portion of the intake passage 4, and an expansion chamber 13 is provided on a downstream end portion of an intake passage 4 connected through the compressor 5 to the air cleaner 12.

FIG. 6 shows the mounting of the apparatus shown in FIGS. 3 to 5 on a motorized two-wheeled vehicle wherein the exhaust turbine 3 is positioned on the front side of the engine 1 and the compressor 5 is positioned on the rear side thereof.

The present invention may be embodied in other specific forms without departing from the spirit or essential characteristics thereof. The presently disclosed embodiments are, therefore, to be considered in all respects as illustrative and not restrictive, the scope of the invention being indicated by the appended claims rather than the foregoing description, and all changes which come within the meaning and range of equivalency of the claims are, therefore, to be embraced therein.

What is claimed is:

1. A supercharger apparatus for a vehicle comprising a reciprocating type internal combustion engine having a block, an exhaust passage and an intake passage, an exhaust port connected to said exhaust passage and an intake port connected to said intake passage, wherein said exhaust port and said intake port are disposed on opposite sides of said engine block, such that there is a crossflow therebetween, and having an exhaust turbine provided in said exhaust passage, a compressor provided in said intake passage and a shaft other than the engine crankshaft, extending through said block for interconnecting said turbine and said compressor, said shaft being supported in a single bearing hole formed in the engine block and said turbine being disposed in front of said engine and exposed to air flow caused by movement of the vehicle, for cooling purposes, and a lubrication oil passage, which is in communication with the bearing hole, being formed in said engine block.

2. A supercharger apparatus as claimed in claim 1 wherein said exhaust turbine and said compressor are disposed on opposite sides of said engine block such that they are separated from one another.

3. A supercharger apparatus as claimed in claim 2 wherein the engine is a straight type multi-cylinder engine, wherein plural cylinders are disposed in line between said opposite sides and extend at a right angle thereto, and wherein said bearing hole extends between said opposite sides through an intermediate portion of said engine block between said cylinders.

4. A supercharger apparatus as claimed in claim 2 wherein the engine is a V-type multi-cylinder engine, wherein plural cylinders are disposed in a V form between said opposite sides, and wherein said bearing hole extends between said opposite sides through a bottom portion of the V formed between said cylinders.

* * * * *